(12) United States Patent
Krohn et al.

(10) Patent No.: US 6,809,330 B2
(45) Date of Patent: Oct. 26, 2004

(54) AUTOMATIC CALIBRATION AND BUILT-IN DIAGNOSTIC PROCEDURES FOR LINE SCAN CAMERAS

(75) Inventors: Robert M. Krohn, Ithaca, NY (US); James S. Howard, Endicott, NY (US); Glenn L. Kehley, Endicott, NY (US); Steven J. Pratt, Endwell, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 78 days.

(21) Appl. No.: 10/321,608

(22) Filed: Dec. 18, 2002

(65) Prior Publication Data

US 2004/0119005 A1 Jun. 24, 2004

(51) Int. Cl.[7] ............................. G01N 21/86; G01V 8/00
(52) U.S. Cl. ..................... 250/559.36; 348/187; 702/94
(58) Field of Search ........................ 250/559.36, 208.1, 250/214 C, 252.1, 339.09, 341.5, 363.09, 559.1; 348/187, 176; 702/94, 95, 85, 150; 378/207

(56) References Cited

U.S. PATENT DOCUMENTS

| | | |
|---|---|---|
| 4,507,683 A | 3/1985 | Griesshaber et al. |
| 4,509,077 A | 4/1985 | Therrien |
| 4,544,952 A | 10/1985 | Pham van Cang |
| 5,179,437 A | 1/1993 | Kawada et al. |
| 5,181,098 A | 1/1993 | Guerin et al. |
| 5,327,226 A | 7/1994 | Tanabe |
| 5,821,993 A * | 10/1998 | Robinson ..................... 348/187 |
| 5,995,142 A | 11/1999 | Matsufune |
| 6,064,759 A | 5/2000 | Buckley et al. |
| 6,101,455 A | 8/2000 | Davis |
| 6,542,185 B1 * | 4/2003 | Bogardus ................. 348/223.1 |

* cited by examiner

Primary Examiner—Thanh X. Luu
Assistant Examiner—Seung C. Sohn
(74) Attorney, Agent, or Firm—Schwartz & Weinrieb

(57) ABSTRACT

A new and improved line scan camera achieves the proper framing of the image field of view by using a first test card to calibrate the true bottom and leading edge portions of the test card which simulate the true bottom and leading portions of an article being scanned or photographed. Still further, the architecture of the electronic chip incorporated within the charge coupled device (CCD) of the camera effectively divides the linear array of pixels into a plurality of channels, and amplifier gain and black offset adjustments are made with respect to exposure levels, characteristic of the pixels disposed at the channel boundaries, under different degrees of input whiteness signals applied to a test card of a predetermined color shade, so as to achieve channel-to-channel seam matching. Subsequently, correction factors are effectively superimposed upon substantially all of the exposure levels characteristic of substantially all of the pixels comprising the line scan of the line scan camera such that true uniform exposure levels are in fact achieved.

29 Claims, 5 Drawing Sheets

AUTOMATIC CALIBRATION AND BUILT-IN DIAGNOSTIC PROCEDURES FOR LINE SCAN CAMERAS

CROSS-REFERENCE TO RELATED PATENT APPLICATION

This patent application is related to U.S. patent application Ser. No. 09/810,397, which was filed on Mar. 19, 2001 in the name of Robert M. Krohn et al., and which is entitled LOW MAINTENANCE LINE SCAN CAMERA.

FIELD OF THE INVENTION

The present invention relates generally to line scan cameras, and more particularly to a new and improved internal automatic calibration and built-in diagnostic system for use in conjunction with a line scan camera wherein an optical assembly, comprising a lens component and a charge-coupled device (CCD) subassembly, and an optical bench assembly, which includes an object plane across which objects to be photographed are conveyed, are initially integrated together such that once the optical assembly is calibrated and locked in position with respect to the optical bench assembly by means of factory technicians, further calibration or recalibration of the optical assembly, or more particularly, further calibration or re-calibration of the lens and charge-coupled device (CCD) components, with respect to each other as well as with respect to the optical bench assembly, and more particularly, with respect to the object plane thereof, is no longer required. In this manner, should routine maintenance of the line scan camera be required whereby the optical components of the camera would need to be disassembled and reassembled, recalibration of the optical assembly, with respect to the optical bench assembly, is obviated. In addition to the foregoing, and subsequent to, calibration of the optical assembly with respect to the optical bench assembly, the line scan camera of the present invention further comprises a new and improved internal automatic calibration and built-in diagnostic system wherein the proper framing of the camera image, as well as the proper exposure levels and uniformity of the photographed image across the entire expanse of the photographed image, is able to be achieved and effectively permanently locked into the internal operating systems of the camera such that once the camera is properly internally calibrated, consistent photographic images can always be achieved thereafter.

BACKGROUND OF THE INVENTION

As disclosed within the aforenoted U.S. patent application Ser. No. 09/810,397, filed on Mar. 19, 2001 in the name of Robert M. Krohn et al., and entitled LOW MAINTENANCE LINE SCAN CAMERA, line scan cameras are used in various industrial or commercial applications, such as, for example, in those instances or circumstances wherein the camera is maintained stationary while the objects to be photographed or scanned are moved with respect to the camera. One such exemplary industrial or commercial application comprises the use of line scan cameras in connection with the high-speed sorting or processing of mail pieces. In accordance with such systems, for example, pieces of mail are conveyed past a point or object plane at which the line scan camera scans or photographs the same. In order to achieve the necessary high-speed scanning or photographing of the mail so as to, in turn, ensure the high-speed processing or sorting of the millions of pieces of mail which enter the mail or postal system on a daily basis, relatively simple, accurate, high-speed, and reliable line scan cameras, devices, or systems are required. In order to achieve such simplicity, accuracy, and reliability in connection with the camera structure, for example, it has been disclosed within the aforenoted patent that the line scan camera has been provided with a positional calibration system whereby once the lens component or assembly has been positionally calibrated with respect to the object plane, as well as with respect to the image or focal plane as defined by means of the charge-coupled device (CCD), additional or further positional recalibration of the lens component or assembly is no longer required.

Accordingly, even if the camera lens and charge-coupled device (CCD) components are removed from their normally fixed or mounted positions defined within the overall line scan camera apparatus, and subsequently replaced or remounted within the overall line scan camera apparatus, in accordance with, for example, the performance of maintenance or repair operations, the original positional locations of the replaced or remounted lens and charge-coupled device (CCD) components of the line scan camera can be ensured by means of the aforenoted calibration systems so as to in fact precisely locate or mount the lens and charge-coupled device (CCD) components at their original positions. In this manner, the need for any additional, subsequent, or supplemental positional calibration by, for example, unskilled field location personnel or technicians, would not in fact be required and would accordingly be obviated. In a similar manner, subsequent to the implementation of the aforenoted positional calibrations being performed by skilled manufacturing personnel or technicians in connection with the various structural components of the camera, that is, once the mounting of the various optical components upon the optical bench assembly has been completed, additional calibrations need to be performed in the field in connection with the internal operational functions or processes of the camera in order to additionally ensure that the actual photographs or images, subsequently taken or captured by means of the camera, will exhibit, for example, the desired image framing, the proper exposure parameters or characteristics, a proper or desired degree of uniformity within and throughout the field of view comprising the image, and the like.

More particularly, for example, it is critically important to accurately determine or properly frame the image field of view, comprising, for example, the true locations of the bottom and leading edges of the article being scanned or photographed such that portions of the captured image, characteristic of the individual articles being scanned or photographed, are not inadvertently cut off or undesirably curtailed. Still further, it is likewise critically important to ensure that the resulting image perceived or captured by means of the line scan camera exhibits substantial uniformity throughout the entire extent thereof such that all regions of the resulting image in fact exhibit high quality contrast, resolution, brightness, and other similarly desirable characteristics.

A need therefore exists in the art for new and improved built-in diagnostic procedures and automatic calibration adjustment or correction techniques for use in conjunction with line scan cameras wherein proper image framing and image characteristics can be automatically achieved, and wherein further, the calibration adjustments or correction factors can be effectively permanently locked into or stored within the line scan camera software whereby once such diagnostic procedures and automatic calibration adjustments or corrections have been performed and achieved, all imaging subsequently performed by means of the line scan camera will exhibit the desired framing and image characteristics.

OBJECTS OF THE INVENTION

Accordingly, it is an object of the present invention to provide a new and improved line scan camera having automatic diagnostics, and calibration procedures and techniques, incorporated therein.

Another object of the present invention is to provide a new and improved line scan camera having automatic diagnostics, and calibration procedures and techniques, incorporated therein so as to effectively overcome the various operational deficiencies characteristic of conventional PRIOR ART line scan cameras.

An additional object of the present invention is to provide a new and improved line scan camera having automatic diagnostics, and calibration procedures and techniques, incorporated therein wherein proper image framing is able to be automatically achieved such that portions of the captured image, characteristic of the individual articles being scanned or photographed, are not inadvertently cut off or undesirably curtailed.

A further object of the present invention is to provide a new and improved line scan camera having automatic diagnostics, and calibration procedures and techniques, incorporated therein wherein uniformity and maximization of exposure levels are able to be achieved throughout the entire extent of the captured image.

A last object of the present invention is to provide a new and improved line scan camera having automatic diagnostics, and calibration procedures and techniques, incorporated therein wherein uniformity and maximization of exposure levels are able to be achieved throughout the entire extent of the captured image by means of suitable calibration adjustments and correction factors, and wherein further, the calibration adjustments or correction factors can be effectively permanently locked into or stored within the line scan camera software whereby once such diagnostic procedures and automatic calibration adjustments or corrections have been performed and achieved, all imaging subsequently performed by means of the line scan camera will exhibit the desired framing and image characteristics.

SUMMARY OF THE INVENTION

The foregoing and other objectives are achieved in accordance with the teachings and principles of the present invention through the provision of a new and improved line scan camera, which comprises automatic diagnostics, and calibration procedures and techniques, incorporated therein, wherein in order to achieve the proper framing of the image field of view, a first test card is employed in order to properly determine the true bottom and leading edge portions of an article being scanned or photographed. The first test card comprises at least one horizontally oriented black line and at least one vertically oriented black line in connection with which the true bottom and leading edge portions of the test card, which simulate the true bottom and leading portions of an article being scanned or photographed, can be determined. More particularly, in connection with the determination of the true bottom edge portion of the first test card, and those of the articles being scanned or photographed, software integrated within the line scan camera is already pre-programmed so as to reflect the fact that the entire vertical extent or expanse of the photographic or image field, as effectively seen or defined within or upon the charge-coupled device (CCD) of the line scan camera, comprises a predetermined number of pixels as serially numbered vertically upwardly from the bottom of the image field to the top of the image field. In addition, the horizontally oriented black line is located a predetermined distance dimension above the bottom edge portion of the calibration card, and the software integrated within the line scan camera is also pre-programmed so as to effectively convert such predetermined distance dimension into a corresponding number of pixels. Therefore, the disposition or location of the bottom edge portion of the calibration card can be readily determined, as can the leading edge portion of the calibration card as a result of similar calibration techniques with respect to the vertically oriented black line of the calibration card.

Still further, the architecture or inherent structure of the electronic chip incorporated within the charge coupled device (CCD) effectively divides the linear array of pixels into four channels, and in order to achieve uniform exposure levels throughout the entire linear array of pixels comprising the line scan of the camera, amplifier gain and black offset adjustments or calibrations are made with respect to the exposure levels characteristic of the pixels disposed at the channel boundaries, under different degrees of input whiteness signals, so as to achieve channel-to-channel seam matching. Subsequently, correction factors are effectively superimposed upon substantially all of the exposure levels characteristic of substantially all of the pixels comprising the line scan of the line scan camera such that true uniform exposure levels are in fact achieved.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

As has been noted hereinbefore, once the positional calibrations have in fact been implemented and completed in connection with the mounting of the various optical components upon the optical bench assembly by means of skilled manufacturing personnel or technicians, and once the various optical components have in fact been mounted upon the optical bench assembly in accordance with aforenoted positional calibrations, additional calibrations need to be performed in the field in connection with the internal operational functions or processes of the camera in order to additionally ensure that the actual photographs or images, subsequently taken or captured by means of the camera, will exhibit, for example, the desired image framing, the proper exposure parameters or characteristics, a proper or desired degree of uniformity within and throughout the image, and the like. One of the first internal calibrations that needs to be initially performed upon and in conjunction with the line scan camera in order to in fact achieve the foregoing imaging attributes comprises a process called bottom edge justification wherein the true or real bottom edge of the desired image frame, as photographed or captured by means of the line scan camera, is properly or accurately determined. More particularly, in order to achieve a high-quality image, the proper or accurate determination of the bottom edge of the image frame must initially be determined in order to accordingly ensure the fact that the photographed image is properly scanned and effectively framed such that, for example, none of the edge portions of the image are inadvertently cut off or improperly curtailed.

Figure 1:
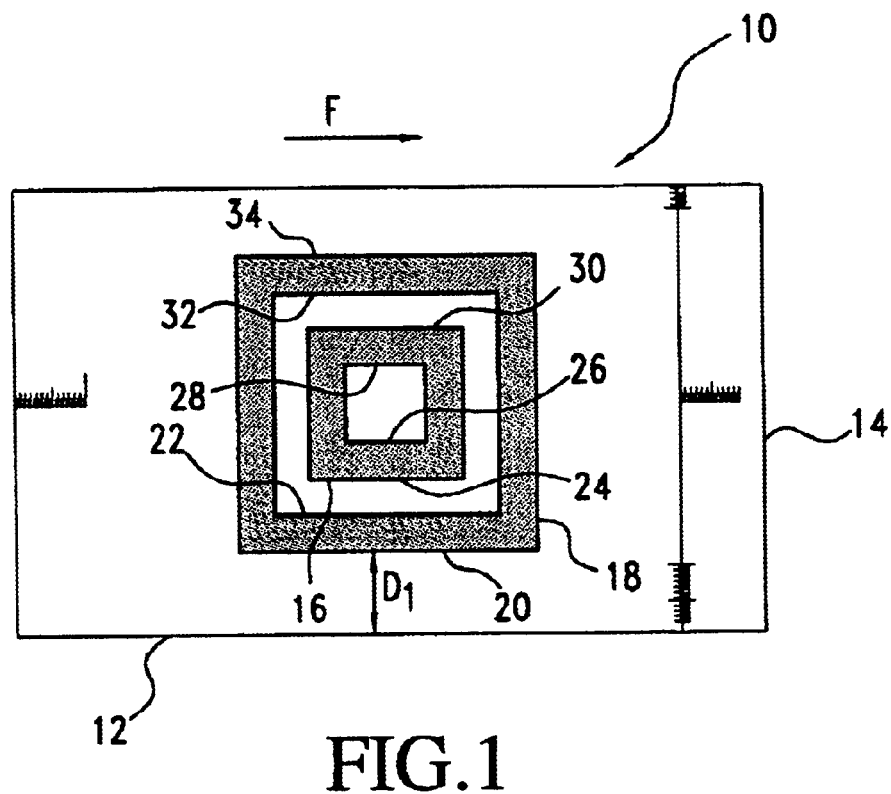
FIG. 1 is a front elevational view of a first calibration card, constructed in accordance with the principles and teachings of the present invention and showing the operative parts thereof, for use in connection with the performance of bottom edge justification calibration techniques for a line scan camera to be used in connection with the photographing or imaging of high-speed mail piece processing systems.

Referring then to the drawings, and more particularly to FIG. 1 thereof, in order to achieve the aforenoted bottom edge justification, a bottom edge justification procedure is initially implemented. In order to perform such a bottom edge justification procedure, a first calibration card, constructed in accordance with the teachings and principles of the present invention, is disclosed and is generally indicated by the reference character 10. The first calibration card 10 is seen to have a substantially rectangular configuration and accordingly comprises a bottom edge portion 12 and a leading edge portion 14 as considered from the viewpoint that the conveyance of the calibration card 10, as well as, of course, the conveyance of subsequent mail pieces across the front portion of the line scan camera during mail piece scanning operations, is from left to right as denoted by means of the arrow F. In addition, it is noted that the central portion of the calibration card 10 is provided with a pair of concentrically spaced inner and outer black squares 16 and 18 such that, for example, a plurality of horizontally oriented, vertically spaced black lines 20,22,24,26,28,30,32, 34 are accordingly defined. Still further, software integrated within the line scan camera is already pre-programmed so as to reflect the fact that the entire vertical extent or expanse of the photographic or image field, as effectively seen or defined within or upon the charge-coupled device (CCD) of the line scan camera, comprises a predetermined number of pixels, such as, for example, two thousand forty-eight (2048) pixels, as serially numbered vertically upwardly from the bottom of the image field to the top of the image field. In addition, it can readily be seen or appreciated that the lowermost black line 20 of the outer black square 18 is located a predetermined distance dimension $D_1$ above the bottom edge portion 12 of the calibration card 10, and it is noted further that the software integrated within the line scan camera is pre-programmed so as to effectively convert such distance dimension $D_1$ into a corresponding number of pixels, such as, for example, five-hundred (500) pixels.

Therefore, considering the relative disposition or position of the lowermost black line 20 of the outer black square 18 and the bottom edge portion 12 of the calibration card 10 from a reversed point of view or perspective viewpoint, then it can be readily appreciated that the bottom edge portion 12 of the calibration card 10 is located at the predetermined distance $D_1$, that is, five hundred (500) pixels, beneath the lowermost black line 20 of the outer black square 18. Accordingly, in accordance with the bottom edge justification or calibration techniques that are uniquely characteristic of the present invention, when the first calibration card 10 is conveyed past the image window of the line scan camera, the image of the first calibration card 10 will be captured and effectively superimposed upon the image field defined upon or within the charge-coupled device (CCD). Therefore, as an example, and recalling the fact that the image field defined upon or within the charge-coupled device (CCD) comprises a vertical extent of, for example, two thousand forty-eight (2048) pixels, when the captured image of the first calibration card 10 is in fact captured and effectively superimposed upon the image field defined upon or within the charge-coupled device (CCD), the software integrated within the line scan camera is also pre-programmed so as to "see" or determine the location of the lowermost black line 20 of the outer black square 18 with respect to the overall image field of view defined upon or within the charge-coupled device (CCD).

Accordingly, if the software of the camera determines that the lowermost black line 20 of the outer black square 18 is located at pixel number seven-hundred fifty (750), and since the distance dimension $D_1$, defining the distance that the lowermost black line 20 of the outer black square 18 is located from or above the true bottom edge portion 12 of the calibration card 10, is five hundred (500) pixels, or as considered from the aforenoted reversed point of view or viewpoint, that is, the true bottom edge portion 12 of the calibration card 10 is located five hundred (500) pixels beneath the lowermost black line 20, then the software of the camera further determines or calculates that the bottom edge portion 12 of the calibration card 10 is in fact truly located at pixel number two hundred fifty (250) as derived by subtracting the pixel distance dimension $D_1$ of five hundred (500) pixels from pixel number seven-hundred fifty (750) at which the lowermost black line 20 of the outermost square 18 was located within the overall image field. Pixel number two hundred fifty (250) is therefore to be considered the new or recalibrated zero position or zero (0) pixel location at which the true vertical image field of view of the camera will commence. Therefore, in accordance with the bottom edge justification calculation or calibration techniques of the present invention, the software of the camera effectively reprograms or instructs the camera electronics to effectively ignore all of those pixels of the image field which are located beneath pixel number two hundred fifty (250). Accordingly, when mail pieces are conveyed past the image window of the camera so as to be photographed thereby, since the bottom edge portion of each mail piece will be located at precisely the same location or position with respect to the image field as was the bottom edge portion 12 of the first calibration card 10, the vertical extent, range, or field of the photographed image of each and every mail piece will be properly framed and captured upon the charge-coupled device (CCD).

Figure 2:
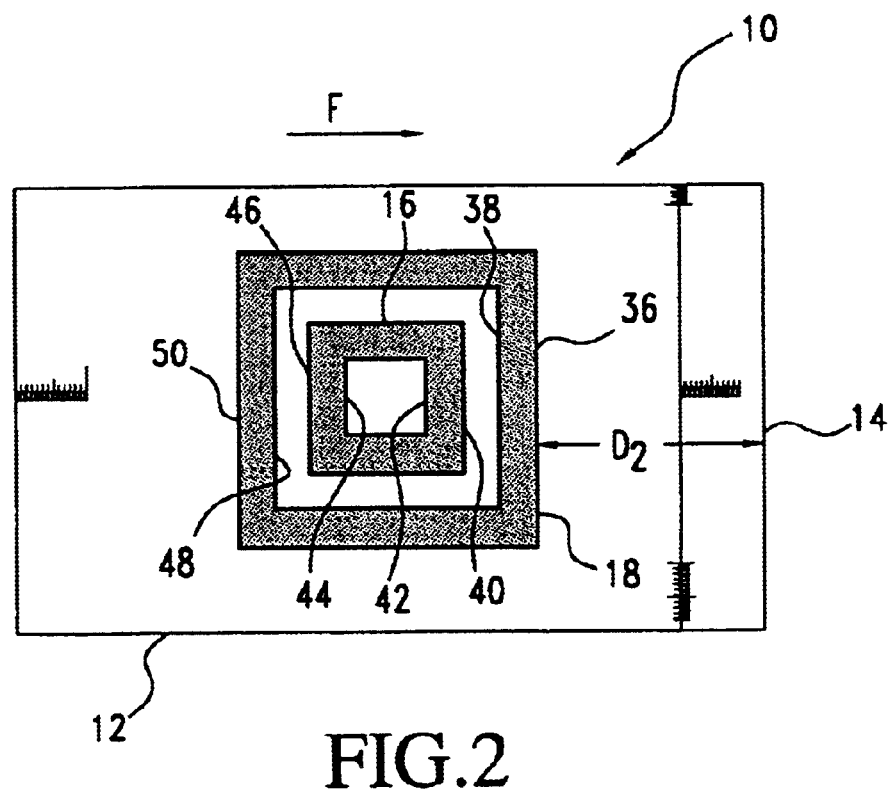
FIG. 2 is a front elevational view of the first calibration card, as disclosed within FIG. 1 and as constructed in accordance with the principles and teachings of the present invention and showing the operative parts thereof, wherein the first calibration card is additionally adapted to be used in connection with the performance of leading edge justification calibration techniques for a line scan camera to be used in connection with the photographing or imaging of high-speed mail piece processing systems.

Continuing further, in addition to the aforenoted performance of the bottom edge justification calibration for achieving the bottom edge justification whereby the true or real bottom edge of the desired image frame, as photographed or captured by means of the line scan camera, is properly or accurately determined, a leading edge justification calibration likewise needs to be performed for achieving leading edge justification whereby the true or real leading edge of the desired image frame, as photographed or captured by means of the line scan camera, is likewise properly or accurately determined. With reference therefore now being made to FIG. 2, wherein the first calibration card 10 of FIG. 1 is again disclosed, although the reference characters 20–34 have been omitted therefrom for clarity purposes only, it is to be appreciated that the first calibration card 10 is also to be used in conjunction with the performance of a leading edge justification calibration technique which is somewhat similar to the previously described bottom edge justification calibration technique. More particularly, as was the case with the performance of the bottom edge justification calibration technique, it is seen that the inner and outer black squares 16 and 18 of the first calibration card 10 likewise define a plurality of vertically oriented, horizontally spaced lines 36,38,40,42,44,46,48,50. In addition, the software integrated within the line scan camera is likewise already pre-programmed so as to reflect the fact that the photographic or image field, as effectively presented to so as to be seen within or defined upon the line scan camera charge-coupled device (CCD), comprises a serially numbered array of scans or pixels, such as, for example, two hundred fifty-six pixels per inch (256/inch), which extend horizontally and leftwardly from the extreme right or leading end of the image field.

It can further be readily seen or appreciated that the right-most vertically oriented line 36 of the outer square 18 is located a predetermined distance dimension $D_2$ inwardly from the leading edge portion 14 of the calibration card 10, and it is noted further that the software integrated within the line scan camera is pre-programmed so as to effectively convert such distance dimension $D_2$ into a corresponding number of pixels. For example, assuming that the rightmost black line 36 of the outer black square 18 is located three inches from the right or leading edge portion 14 of the calibration card 10, then such distance dimension $D_2$ is equal to seven-hundred sixty-eight (768) pixels, or as was the case of the bottom justification comprising the disposition of the bottom edge portion 12 with respect to the lowermost black line 20 of the outer black square 18, when considered from the reversed point of view, the right or leading edge portion 14 of the calibration card 10 is located seven hundred sixty-eight (768) pixels from the right-most black line 36 of the outer black square 18. Therefore, in accordance with the leading edge justification or calibration techniques that are uniquely characteristic of the present invention, when the first calibration card 10 is conveyed past the image window of the line scan camera, we will be able to use such information in order to calculate and calibrate the line scan camera so as to precisely locate not only the right or leading edge portion of the first calibration card 10, but in addition, the right or leading edge portion of each article, object, or mail piece which is subsequently conveyed past the scanning or imaging window of the line scan camera.

In connection with such leading edge justification techniques characteristic of the present invention, it is to be further appreciated, however, that unlike the bottom edge justification techniques previously described, wherein the bottom edge portion 12 of the first calibration card 10, as well as, of course, the bottom edge portion of each one of the serially conveyed mail pieces, is effectively static in that the same is always disposed at the same elevational position with respect to the window disposed within the object plane of the line scan camera during conveyance of the calibration card 10, as well as the mail pieces, past the window of the line scan camera, the leading edge portion 14 of the calibration card 10, as well as, of course, the leading edge portion of each one of the serially conveyed mail pieces, is effectively dynamic or constantly changing as the calibration card 10, as well as each one of the mail pieces, is conveyed past the window of the line scan camera. An appropriate signal must therefore be transmitted to the line scan camera so as to not only alert the line scan camera to the fact that the calibration card 10, or a mail piece during an actual mail piece photographing or scanning operation, is approaching the window through which line scanning of the calibration card 10, or of a particular one of the mail pieces, can in fact be serially photographed or scanned, but in addition, the signal must also effectively initiate the photographing or scanning of the card 10 or mail piece at a precisely calibrated moment in time.

Figure 6:
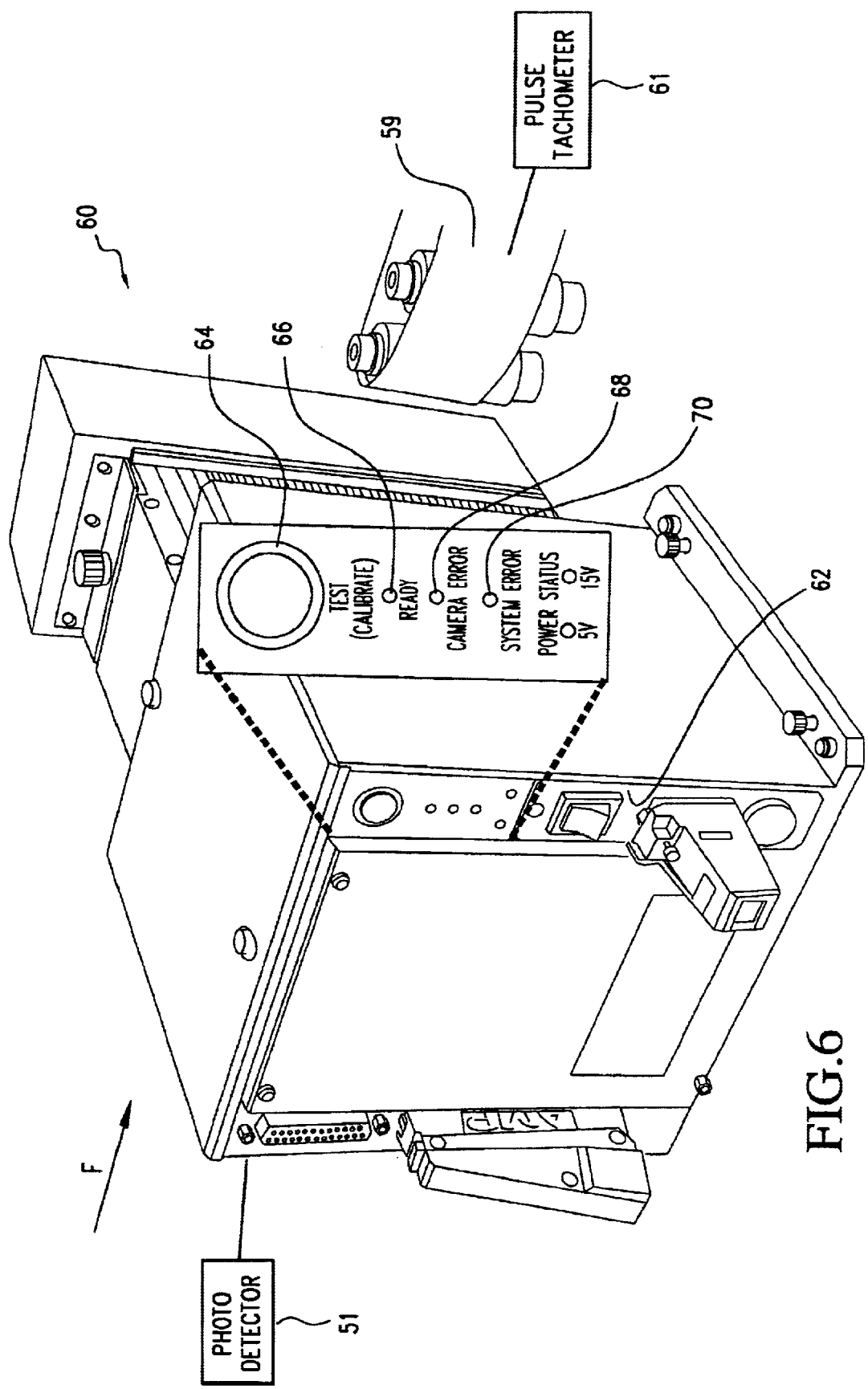
FIG. 6 is a rear perspective view of a line scan camera of the type which is to be calibrated in accordance with the various techniques characteristic of the present invention.

Accordingly, a photodetector or photoeye assembly 51 is disposed upstream of the window of the line scan camera 60, as schematically shown in FIG. 6, so as to detect the leading edge portion 14 of the oncoming calibration card 10 or the leading edge portions of the individual mail pieces as they are conveyed in the direction F toward the line scan camera window by means of a suitable conveyor mechanism 59, only a portion of which is illustrated. Consequently, as a result of the leading edge portion 14 of the conveyed calibration card 10 being conveyed toward the scanning window of the line scan camera 60, and as a result of the leading edge portion 14 of the calibration card 10 passing the photodetector or photoeye assembly 51, whereby the calibration card 10 will now block or interrupt the light transmitted by means of the photodetector or photoeye assembly 51, the photodetector or photoeye assembly 51 will emit a signal and transmit the same to the camera electronics along with pulses from a tachometer 61. The pulse tachometer 61 is operatively associated with the conveyor mechanism 59 so as to effectively issue two hundred fifty-six (256) signal pulses for each one inch (1.00") of travel of the conveyor mechanism 59, that is, each pulse is effectively equal to one pixel. The pulses from the pulse tachometer 61 are in turn transmitted to an electronic counting mechanism, not shown, which is disposed internally within the line scan camera 60 and which is operatively associated with the software of the camera 60. At the same time, the signal emitted from the photodetector or photoeye assembly 51 is also transmitted to the line scan camera 60 such that the same initiates its photographing or scanning mode which, as has been noted hereinbefore, also comprises two-hundred fifty-six (256) scans or pixels per inch.

At this point in time, the calibration card 10, or a subsequently conveyed mail piece, might not yet be disposed in front of the scanning window of the line scan camera 60, however, for our calibration purposes, this is unimportant. What is important is the fact that photographing or scanning has been commenced, and the number of pixel scans is being counted. Accordingly, when the test or calibration card 10 actually passes the scanning window of the line scan camera 60 such that the software of the camera "sees" or detects the presence of the right-most black line 36 of the outer black square 18, the software can in turn effectively determine at what pixel scan number the right-most black line 36 of the outer black square 18 is located as a result of the operative association of the software with the aforenoted counting mechanism of the camera 60. As an example, let it be assumed that the right-most black line 36 of the outer black square 18 was detected at pixel scan number three thousand (3000). Since the distance dimension $D_2$, defining the distance that the right-most black line 36 of the outer black square 18 is located from or to the left of the true leading edge portion 14 of the calibration card 10, or considered from a reversed or alternative point of view, the distance that the leading edge portion 14 of the calibration card 10 is located from the right-most black line 36 of the outer black square 18, has been previously noted as comprising seven hundred sixty-eight (768) pixels, then the software of the camera further determines or calculates the fact that the leading edge portion 14 of the calibration card 10 is in fact truly located at pixel number two thousand two hundred thirty-two (2232) as derived by subtracting the pixel distance dimension $D_2$ of seven hundred sixty eight (768) pixels from the pixel scan number three thousand (3000).

Pixel number two thousand two hundred thirty-two (2232) is therefore to be considered the new or recalibrated zero position or zero (0) pixel location at which the photographic scanning of the line scan camera 60 will effectively be captured and preserved. More particularly, in accordance with the leading edge justification calculation or calibration techniques of the present invention, the software of the line scan camera 60 effectively re-programs or instructs the camera electronics to effectively ignore all of those pixels of the image field which are located to the right of pixel number two thousand two hundred thirty-two (2232) each time, for example, a mail piece is conveyed passed the photodetector assembly 51 in preparation for being photographed or scanned by means of the line scan camera 60. Accordingly, when mail pieces are conveyed past the image window of the line scan camera 60 so as to be photographed thereby, since the leading edge portion of each mail piece will be located at precisely the same location or position with respect to the image field of the charge-coupled device, as was the leading edge portion 14 of the first calibration card 10, the horizontal extent, range, or field of the photographed image of each and every mail piece will be properly framed and captured by or upon the charge-coupled device (CCD).

Figure 3:
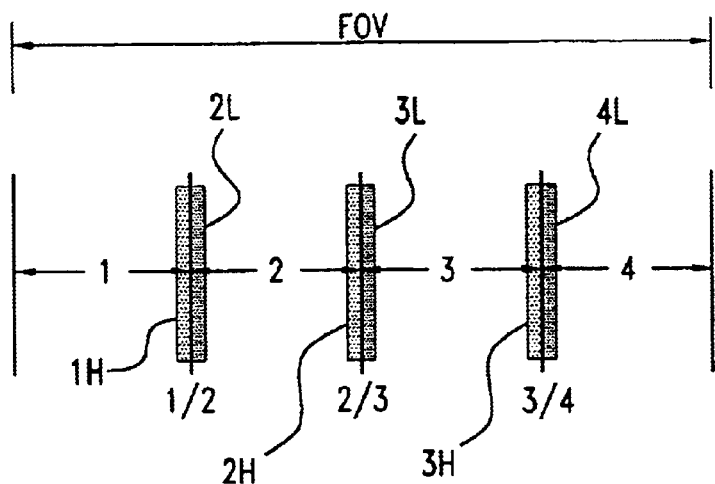
FIG. 3 is a schematic diagram illustrating, in accordance with the particular structure or architecture of the image sensor incorporated within the electronic chip of the charge-coupled device (CCD) of the line scan camera of the present invention, the field of view which comprises two thousand forty-eight (2048) pixels wherein such field of view is divided into four channels with each channel comprising five hundred twelve (512) pixels, and wherein furthere, three channel seams are effectively defined and across which channel-to-channel seam matching calibration is to be performed and achieved.
Figure 4:
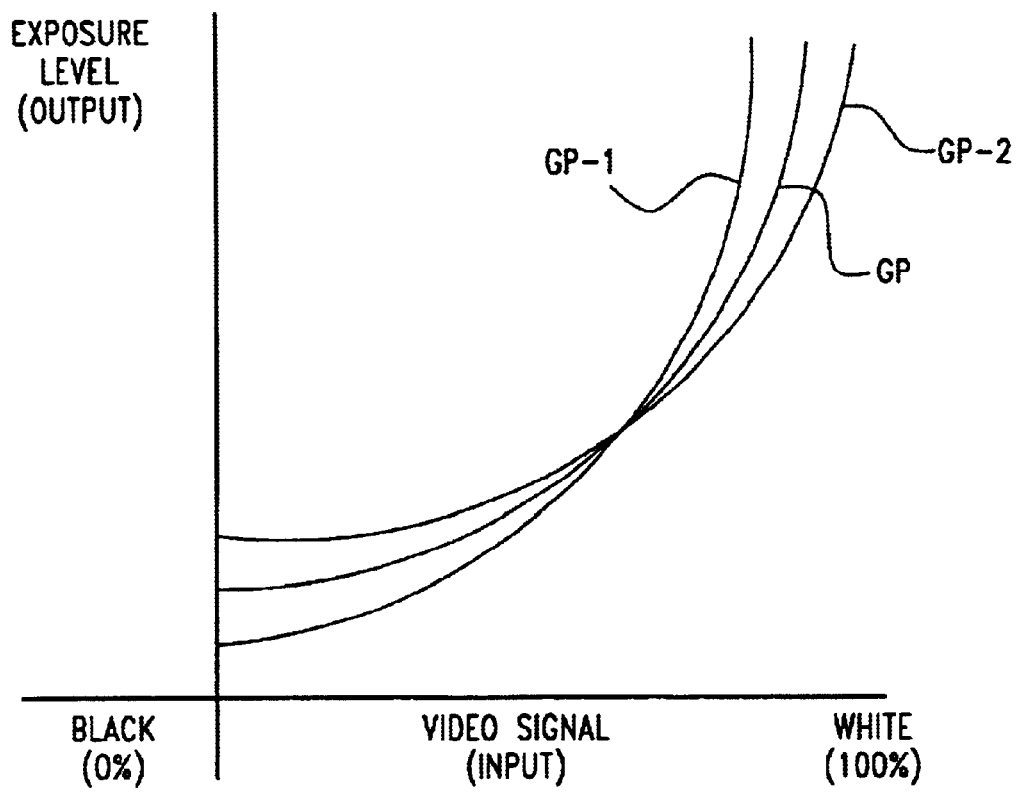
FIG. 4 is a graphical plot, illustrating the relationship defined between video signal inputs and the correspondingly responsive exposure level outputs, in order to appreciate the interrelated effects of black offset and amplifier gain adjustments upon the responsive exposure level outputs as functions of different video signal inputs or levels, wherein such black offset and amplifier gain adjustments are iteratively performed in connection with the ultimate achievement of optimum channel-to-channel seam matching calibration.

With reference now being made to FIGS. 3 and 4, another type of internal calibration operation which is to be performed in connection with the line scan camera comprises black offset and amplifier gain adjustments which are to be iteratively performed in order to ultimately achieve channel-to-channel seam matching. As illustrated within FIG. 3, there is schematically illustrated the line scan camera field of view FOV as captured by means of the charge coupled device (CCD), wherein the line scan field of view FOV comprises two-thousand forty-eight (2048) pixels. In accordance with the particular architecture or structure characteristic of the electronic chip of the charge-coupled device (CCD) and the software integrated or incorporated into the line scan camera, the line scan field of view FOV comprising the two-thousand forty-eight (2048) pixels is divided into four channels 1,2,3,4, wherein each channel comprises five hundred twelve (512) pixels and wherein circuitry controls all of the five hundred twelve (512) pixels within each channel. The boundaries defined between each pair of successive or adjacent channels are denoted as 1/2,2/3,3/4, and the five highest-numbered and five lowest-numbered pixels, that are present within each channel 1,2,3,4 and which are disposed at the respective boundaries 1/2,2/3,3/4, are designated as 1H,2L, 2H/3L, and 3H/4L.

As is known in the art or industry, all of the pixels that define the line scan camera image field of view FOV will exhibit exposure levels which can have a value anywhere within the range of 0–255. It is also known in the art or industry that each one of the two-thousand forty-eight (2048) pixels comprising or defining the entire line scan camera image field of view FOV will, due to various factors which cannot effectively be controlled, exhibit exposure levels which will be different under different light or signal input conditions, and it is known still further that each one of the two-thousand forty-eight (2048) pixels comprising or defining the entire line scan camera image field of view FOV will likewise exhibit exposure levels which will be different from the exposure levels of all of the other pixels comprising or defining the entire line scan camera image field of view FOV under the same light or signal input conditions. In order to achieve uniformity in connection with the exposure levels exhibited by means of all of the two-thousand forty-eight (2048) pixels comprising or defining the entire line scan camera image field of view FOV, it is firstly desired to achieve such uniformity in connection with those pixels which define the channel boundaries 1/2, 2/3,3/4.

More particularly, it is firstly desired to provide the pixel groups 1H,2L, 2H,3L, and 3H,4L with substantially the same exposure levels such that uniformity in the exposure levels across each one of the channel boundaries 1/2, 2/3,3/4 is in fact achieved, hence the aforenoted nomenclature of channel-to-channel seam matching. In connection with the performance of such channel-to-channel seam matching, a second calibration card, not shown, is utilized, however, the second calibration card is unlike the first calibration card 10. The second calibration card comprises a substantially rectangular card, however, unlike the first calibration card 10, the second calibration card is blank, that is, it does not have any markings or indicia thereon, and furthermore, the second calibration card is off-white in color. In addition, while the first calibration card 10 was dynamically conveyed past the image window of the line scan camera, the second calibration card is static or maintained stationary in front of the image window of the line scan camera, and in accordance with the calibration techniques characteristic of the channel-to-channel seam matching, the second calibration test card is adapted to be subjected to different video signal inputs such that the internal illumination system will effectively be changed or dimmed from a relatively high whiteness level to a relatively low whiteness level. Controlling the brightness of the illumination system permits the single second calibration test card to be utilized in effectively simulating many different cards displaying many different shades of gray.

More particularly, with reference being made to FIG. 4, it is seen that exposure output levels are plotted against video signal input levels, and furthermore, it can readily be appreciated that the video signal input levels are effectively indicative of the degree or level of the brightness of the illumination as measured in percentage of whiteness, that is, from zero percent (0%) whiteness or black conditions to one-hundred percent (100%) whiteness or white conditions. Consequently, as the brightness of the illumination system is increased, the exposure output levels are correspondingly changed, the graphical plot of such relationship being generally illustrated as GP. Continuing further, it is also known in the art or industry that adjustments in the amplifier gain and black offset parameters can affect the resulting exposure output levels, and that such adjustments in the amplifier gain and black offset parameters are also interrelated so as to likewise affect each other. For example, as can be appreciated from FIG. 4, when adjustments are made to the black offset parameters, the slope of the graphical plot GP will be changed, as is graphically illustrated by means of the auxiliary graphical plots GP-1 and GP-2, and conversely, when adjustments are made to the amplifier gain parameters, the elevational disposition or location of the graphical plot GP will be altered upwardly or downwardly. As a result of the different slope characteristics of the different graphical plots GP, GP-1,GP-2, it can be appreciated that for a predetermined video signal input, a different exposure output level will be achieved, however, it can be further appreciated, for example, that in connection with the various graphical plots GP,GP-1,GP-2, such graphical plots GP,GP-1,GP-2 do not or may not necessarily pass through the intersection of the video signal input and the exposure output level axes so as to indicate the fact that a zero input signal produces a zero exposure output level. This characteristic is not particularly important in connection with the objectives of the present invention. What is critically important for the purposes or objectives of the present invention is that the exposure level outputs per video signal inputs, for all four of the channels, effectively correspond to each other so as to obtain the aforenoted uniformity or channel-to-channel seam matching at any video input level.

Consequently, amplifier gain adjustments must accordingly be made so as to, for example, effectively elevate or lower the graphical plots GP,GP-1,GP-2, however, it is to be appreciated that when such adjustments are made to the amplifier gain parameters, the entire graphical plot GP may be elevated or lowered, for example, whereby, such plots, not shown for clarity purposes, may no longer provide us with the desired correlation between the video signal input and the exposure level output. Accordingly, adjustments must correspondingly be made to the black offset parameters, in conjunction with adjustments to the amplifier gain parameters, so as to effectively alter the slope characteristics and elevational positions of such plots and thereby have such plots, of all of the channels, ultimately achieve the aforenoted uniformity or channel-to-channel seam matching with respect to each other. It can therefore be appreciated that the adjustment procedures or techniques performed in connection with the amplifier gain and black offset parameters comprise multiple iterations.

Utilizing the aforenoted amplifier gain and black offset parameter adjustment procedures or techniques in conjunction with the various exposure levels of the different pixels comprising the groups of channel boundary pixels 1H,2L, 2H,3L, and 3H,4L, as illustrated within FIG. 3, in order to achieve the aforenoted uniformity in the exposure levels across each one of the channel boundaries 1/2,2/3,3/4 so as to, in turn, achieve the aforenoted channel-to-channel seam matching, it is firstly noted that each one of the groups of channel boundary pixels 1H,2L, 2H,3L, and 3H,4L comprises five pixels. More particularly, the first group of pixels 1H comprises, for example, pixels numbered 508–512, the second group of pixels 2L comprises, for example, pixels numbered 513–517, the third group of pixels 2H comprises, for example, pixels numbered 1020–1024, the fourth group of pixels 3L comprises, for example, pixels numbered 1025–1029, the fifth group of pixels 3H comprises, for example, pixels numbered 1532–1536, and the sixth group of pixels 4L comprises, for example, pixels numbered 1537–1541. Accordingly, in order to achieve the aforenoted channel-to-channel seam matching, the exposure levels of all of the two thousand forty-eight (2048) pixels comprising or defining the entire line scan camera image field of view FOV are initially determined under full video signal input or one-hundred percent (100%) whiteness conditions, although it is to be noted that true white conditions will not actually be achieved, even when full video signal input or one-hundred percent (100%) whiteness signals conditions are implemented because the second calibration test card is off-white in color.

When the exposure levels of all two thousand forty-eight (2048) pixels comprising or defining the entire line scan camera image field of view FOV have in fact been determined under full video signal input or one-hundred percent (100%) whiteness conditions, the particular or single pixel, of all two thousand forty-eight (2048) pixels defining the entire line scan camera image field of view FOV, which exhibits the highest exposure level is then determined or detected, such pixel being denoted for the present purposes as P-HEL. Remembering that the highest exposure level that can be achieved under full video signal input or one-hundred percent (100%) whiteness conditions is 255, a target exposure level which is somewhat less than 255, such as, for example, 245 or 250, in order to effectively prevent the introduction or impression of overexposure conditions into or upon the captured images, is then selected for that particular or single pixel P-HEL exhibiting the aforenoted highest exposure level. Subsequently, in order to provide such particular or single pixel P-HEL with the desired target exposure level, the software of the camera automatically introduces or impresses an amplifier gain adjustment upon the video input signal for such particular or single pixel P-HEL so as to in fact achieve the desired or target exposure level output for that particular or single pixel P-HEL. Remembering further that the electronic circuitry operatively associated with each individual channel controls the exposure levels of all of the pixels comprising or disposed within a particular channel, then as a result of such adjustment in gain in connection with the aforenoted particular or single pixel P-HEL, which may be located within any one of the four channels 1,2,3,4, it is further noted that all of the exposure levels for all of the pixels within that channel will be enhanced an amount equal to the gain adjustment made in connection with that particular or single pixel P-HEL which now has its exposure level at the desired or target level.

Once such gain adjustment is completed in connection with the particular or single pixel P-HEL originally exhibiting the maximum or highest exposure level, the finalized amplifier gain adjustment, which has been made in connection with the particular or single pixel P-HEL originally exhibiting the maximum or highest exposure level, as well as all of the other pixels located within the same channel as that of the particular or single pixel P-HEL, is permanently stored within the camera memory, and channel-to-channel seam matching can now be performed. More particularly, the exposure levels of all of the aforenoted numbered pixels comprising each one of the groups of channel boundary pixels 1H,2L, 2H,3L, and 3H,4L are initially determined, and an average exposure level for each one of the groups of channel boundary pixels 1H,2L,2H,3L,3H,4L is determined. Subsequently, the averaged exposure levels for each set of matched channel boundary pixel groups, that is, the averaged exposure levels for groups 1H and 2L, or 2H and 3L, or 3H and 4L, are compared, and under varying light, illumination, or video signal input conditions, which effectively simulate full signal or white conditions as well as a predetermined number of varying dimmed light or gray conditions simulating, for example, objects to be scanned or photographed which may be colored other than true white, black offset and amplifier gain adjustment signals are iteratively impressed upon those pixels comprising the matched channel boundary pixel groups 1H,2L, and 2H,3L, and 3H,4L until properly matched or substantially identical exposure levels for each set of matched channel boundary pixel groups 1H,2L, and 2H,3L, and 3H,4L is achieved.

It is of course to be appreciated, in conjunction with the foregoing, that only the exposure levels for those pixels disposed within the particular ones of the groups of pixels 1H,2L,2H,3L,3H,4L, other than the pixels of the particular one of the groups of pixels 1H,2L,2H,3L,3H,4L which correspond to the channel within which the original particular or single pixel P-HEL having the highest exposure level was detected or determined, have their exposure levels altered or adjusted by means of the black offset and amplifier gain parameters. The reason for this is that the exposure level of the original particular or single pixel P-HEL having the highest exposure level has already been adjusted and effectively frozen, in the camera computer memory, at the target or desired exposure level, and consequently, it is not desired to change, alter, or adjust the exposure level of the original particular or single pixel P-HEL or the exposure levels of any of the other pixels disposed within the particular channel within which the original particular or single pixel P-HEL is located. In other words, the original particular or single pixel P-HEL, and its corresponding channel, effectively serves as a MASTER, while the other channels, and the pixels disposed therein, effectively serve as SLAVES.

Consequently, if, for example, the original particular or single pixel P-HEL is located within channel 2, then the exposure levels of the pixels comprising the groups of pixels 2L and 2H are not at all adjusted so as not to change or alter the exposure level of the original particular or single pixel P-HEL which had the highest exposure level and which, as has been noted, has already been adjusted and effectively frozen, in the camera computer memory, at the target or desired exposure level. However, those pixels of groups 1H and 3L are adjusted so as to correspond with or match the exposure levels of the pixels comprising the pixel groups 2L and 2H, and such adjustments to the pixels of the groups 1H and 3L are likewise entered into the memory of the camera computer. Since the pixels of group 3L are now adjusted, those pixels of group 3H are effectively frozen and are not adjusted further, and the pixels of group 4L are in fact adjusted so as to correspond with or match the exposure levels of the pixels of group 3H, such adjustments to the pixels of group 4L likewise being entered into the memory of the camera computer. It is to of course be appreciated that similar iterative black offset and amplifier gain adjustments would be made to the various pixels disposed within particular ones of the groups of pixels 1H,2L,2H,3L,3H,4L if, for example, the channel location of the particular or single pixel P-HEL, originally exhibiting the maximum or highest exposure level, was other than that of channel 2. In this manner, channel-to-channel seam matching across the entire line scan camera image field of view FOV is able to be achieved.

Figure 5A:
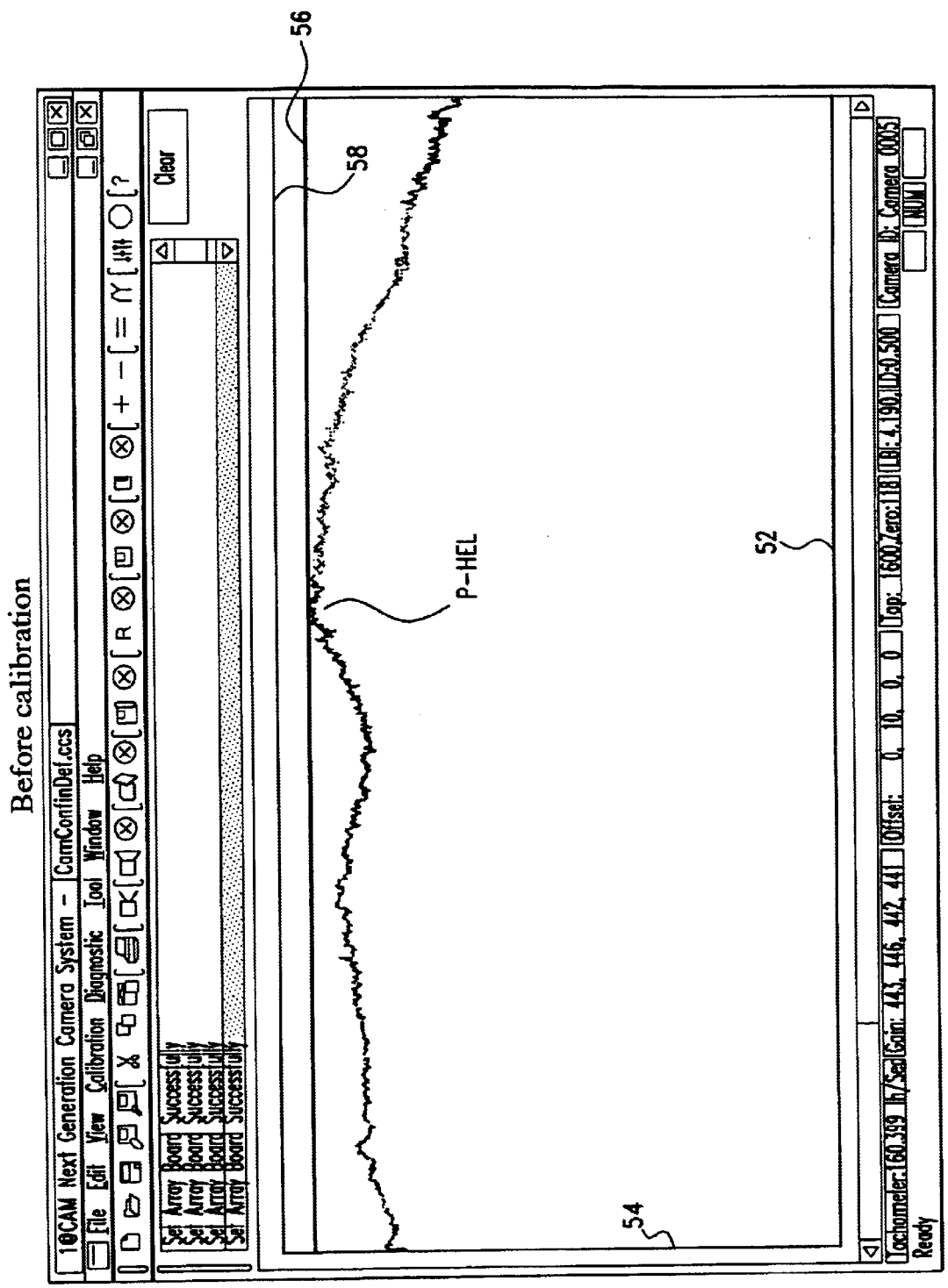
FIG. 5a is a graphical plot illustrating the illumination level at each pixel prior to the performance of radiometric correction calibration.

At this point in time, that is, after channel-to-channel seam matching has been achieved, the exposure levels characteristic of all two thousand forty-eight (2048) pixels, defining the entire line scan camera image field of view FOV, may be graphically appreciated from FIG. 5a. More particularly, the horizontally oriented x-axis 52 denotes the particular pixel number, while the vertically oriented y-axis 54 denotes the exposure level characteristic of each individual pixel. As can be readily appreciated, the particular or single pixel P-HEL originally exhibiting the maximum or highest exposure level is noted upon the graph of FIG. 5a, as is the target exposure level line of, for example, 245 or 250, as is noted at 56, as well as the ultimate exposure level line of 255, as is noted at 58. Accordingly, it can be further appreciated that while channel-to-channel seam matching has been achieved and completed, the exposure levels characteristic of all two thousand forty-eight (2048) pixels defining the entire line scan camera image field of view FOV still exhibit some residual non-uniformity throughout or across the entire line scan camera image field of view FOV. Accordingly, in order to in fact achieve uniformity of the exposure levels of all of the two thousand forty-eight (2048) pixels throughout or across the entire line scan camera image field of view FOV, additional calibration techniques, comprising what is hereby termed radiometric correction, is to be performed. More particularly, in accordance with such radiometric correction techniques, and as can be readily appreciated from a comparison of FIGS. 5a and 5b, the software of the camera effectively computes a multiplication correction factor for each and every one of the two thousand forty-eight (2048) pixels whereby the existing exposure level, characteristic of each one of the two thousand forty-eight (2048) pixels after the completion of the aforenoted channel-to-channel seam matching procedures or techniques, is effectively converted from its particular value, derived as a result of the aforenoted channel-to-channel seam matching procedures or techniques, to a new value which renders the exposure levels characteristic of all of the two thousand forty-eight (2048) pixels extending throughout or across the entire line scan camera image field of view FOV substantially identical. The only exception to this radiometric correction processing or calibration procedure is in connection with the particular or single pixel P-HEL which originally exhibited the maximum or highest exposure level and which has already been adjusted to the target exposure level, as seen in FIG. 5a, just prior to the implementation of the channel-to-channel seam matching procedures, whereby no further correction or calibration is required.

Figure 5B:
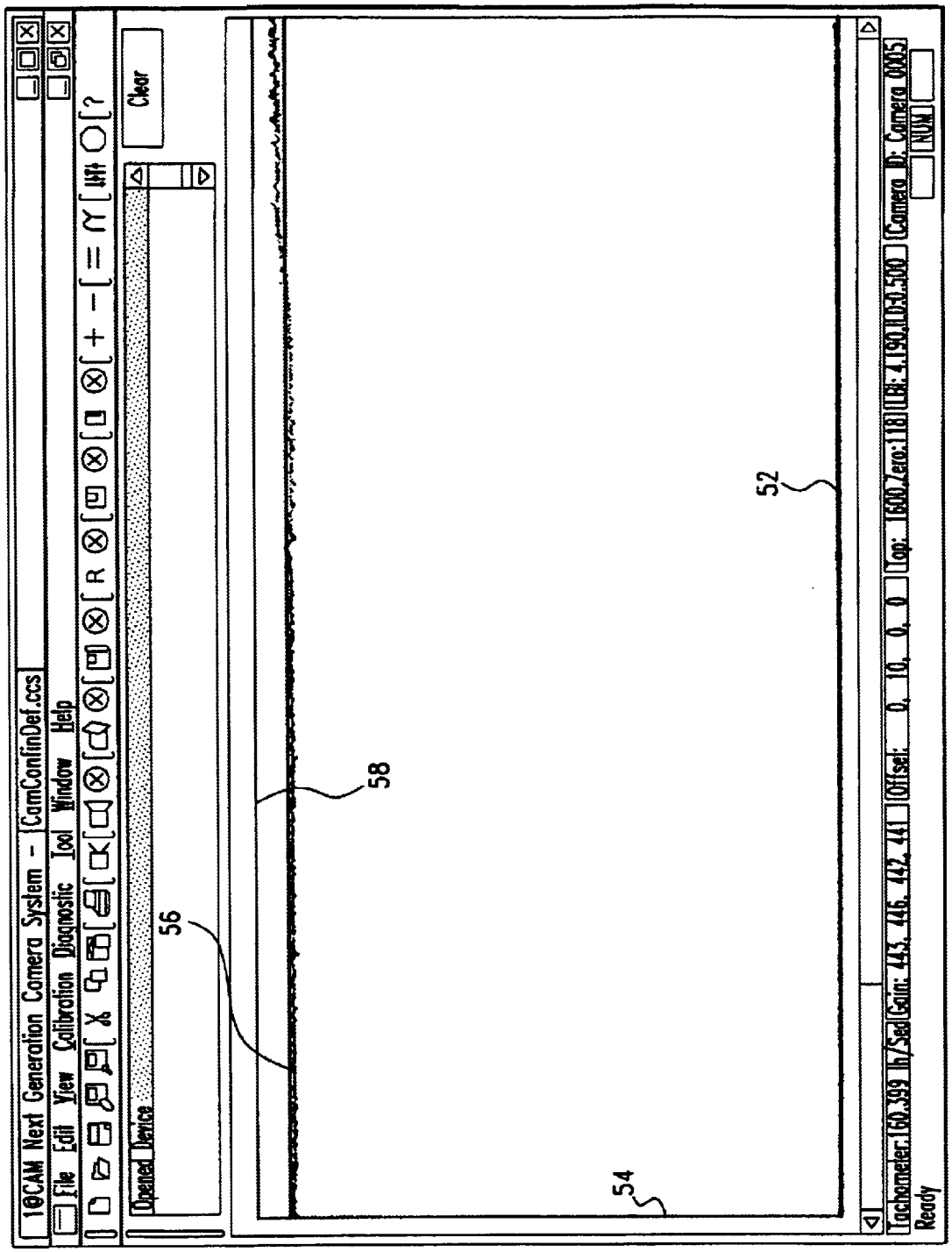
FIG. 5b is a graphical plot, similar to that of FIG. 5a, illustrating the illumination level at each pixel subsequent to the performance of radiometric correction calibration.

In particular, assuming, for example, that the target exposure level, as noted at 56 in FIGS. 5a and 5b, is 245, and a particular pixel, as disclosed or graphically depicted within FIG. 5a, has an exposure level of 235 as a result of the aforenoted channel-to-channel seam matching calibration procedures, then in accordance with the radiometric correction calibrations characteristic of the present invention, the software of the camera will automatically implement a multiplication correction factor of 1.0426 in connection with the exposure level signal characteristic of such pixel. As a result of multiplying the existing exposure level of 235 by means of the multiplication correction factor of 1.0426, the particular pixel will now exhibit an exposure level of substantially 245. Similar multiplication correction factors are automatically derived or computed in connection with each and every pixel of the two thousand forty-eight (2048) pixels defining the entire line scan camera image field of view FOV, and such multiplication correction factors are permanently stored within the camera computer memory for each and every pixel of the two thousand forty-eight (2048) pixels defining the entire line scan camera image field of view FOV. In this manner, in connection with all images subsequently captured by means of the line scan camera of the present invention in connection with the scanning or photographing of objects or articles being conveyed past the line scan camera window, all of the two thousand forty-eight (2048) pixels comprising the image field of view FOV will exhibit substantially the same or uniform exposure levels. It is noted in connection with the performance of such radiometric correction calibration, such procedures are performed under full one-hundred percent (100%) video signal input conditions in view of the fact that the correction multiplication factor will have substantially the same effect upon the exposure levels of all of the two thousand forty-eight (2048) pixels comprising the image field of view FOV, regardless of the particular whiteness or video signal input conditions.

Lastly, in order to ensure that all of the preceding calibration procedures, operations, or techniques, except for the radiometric correction calibration as will be explained shortly hereinafter, are in fact able to be properly or optimally carried out as desired in accordance with the principles and teachings of the present invention, the software of the camera also comprises internal diagnostics which effectively indicates or exhibits an ERROR mode if certain or predetermined parameters register as aberrations, that is, if particular parameters exceed predetermined "threshold" values. For example, prior to the implementation of the radiometric correction calibration, the exposure level of each one of the two thousand forty-eight (2048) pixels comprising the image field of view FOV is examined and compared to its neighboring pixels in order to determine whether or not the particular pixel exhibits an exposure level which is so significantly different from the exposure levels of its neighboring pixels as to effectively indicate that some aberration or error is or is not present within such particular pixel. An aberration of the foregoing type might comprise, for example, dirt upon a particular point location of the line scan camera window whereby such would deleteriously affect the transmission of the corresponding portion of the captured image toward a particular one or ones of the two thousand forty-eight (2048) pixels comprising the image field of view FOV. Alternatively, an error may be present within the memory of the camera computer. Still further, an error may comprise an operator error, such as, for example, the fact that the off-white second test calibration card has not been properly placed or oriented with respect to the line scan camera window.

As has been alluded to hereinbefore, while the internal diagnostics have been lastly described herein as another type of diagnostics or calibration to be performed in connection with the overall calibration of the line scan camera, the internal diagnostics are actually performed prior to the performance of the aforenoted radiometric correction calibrations. The reason for this is that it is not desired for the correction effects of the radiometric correction calibrations to affect or mask the diagnostic error or aberration detection capabilities of the system. In any case, as can best be seen in FIG. 6, the line scan camera 60 has a rear panel 62 upon which a plurality of operational and diagnostic buttons are located. In particular, a first TEST (CALIBRATE) button 64 is provided upon the panel 62 so as to initiate or START the performance of the various calibration procedures. A green READY light or LED 66 indicates the ready status of the diagnostic and calibration system, while a red CAMERA ERROR light or LED 68 and a red SYSTEM ERROR light or LED 70 are also present upon the panel 62. The CAMERA ERROR light or LED 68 will be illuminated when, for example, an error is detected with respect to one of the camera's optical components, while the SYSTEM ERROR light or LED 70 will be illuminated when, for example, an error is detected with respect to the computer control system of the camera. Alternatively with respect to the TEST (CALIBRATE) or START button 64, the calibration procedures may be initiated or commenced from a suitable computer monitor menu.

Thus, it may be seen that in accordance with the principles and teachings of the present invention, there has been provided a new and improved line scan camera, having various diagnostic procedures and automatic calibration adjustment or correction techniques incorporated therein, wherein proper image framing and image characteristics can be automatically achieved, and wherein further, the calibration adjustments or correction factors can effectively be permanently locked into or stored within the line scan camera software whereby once such diagnostic procedures and automatic calibration adjustments or corrections have been performed, achieved, and stored within the camera memory, all imaging subsequently performed by means of the line scan camera will exhibit the desired framing and image characteristics.

In light of the above teachings, it is to be understood that many variations and modifications of the present invention are possible. It is therefore to be understood further that within the scope of the appended claims, the present invention may be practiced otherwise than as specifically described herein.

What is claimed as new and desired to be protected by Letters Patent of the United States of America, is:

1. In combination, a calibration card for use in conjunction with a line scan camera for determining the true bottom edge portion of an image field of view of an object being scanned by said line scan camera, comprising:

a line scan camera;

a charge-coupled device (CCD), defining a field of view comprising a predetermined number of pixels, incorporated within said line scan camera and upon which a captured image of an object can be superimposed;

a calibration card having a substantially rectangular configuration and comprising a horizontally oriented bottom edge portion and a vertically oriented leading edge portion;

at least one horizontally oriented dark line disposed upon said calibration card at a predetermined vertical distance above said bottom edge portion of said calibration card; and software means, incorporated within said line scan camera and pre-programmed with said vertical distance that said at least one horizontally oriented dark line of said calibration card is spaced from said horizontally oriented bottom edge portion of said calibration card as a predetermined number of pixels, for determining the particular pixel number location of said at least one horizontally oriented dark line, with respect to said predetermined number of pixels comprising said image field of view, so as to determine the particular pixel number location of said bottom edge portion of said calibration card, which simulates the true bottom edge portion of an object being scanned by said line scan camera, by correlating said pre-programmed predetermined number of pixels, defining said vertical distance between said at least one horizontally oriented dark line of said calibration card and said bottom edge portion of said calibration card, with said particular pixel number location of said at least one horizontally oriented dark line as previously determined from said predetermined number of pixels comprising said image field of view, whereby the true bottom edge portion of an image field of view of an object being scanned by said line scan camera is determined.

2. The combination as set forth in claim 1, wherein said software means further comprises:

means for subtracting said pre-programmed predetermined number of pixels, defining said vertical distance between said at least one horizontally oriented dark line of said calibration card and said bottom edge portion of said calibration card, from said particular pixel number location of said at least one horizontally oriented dark line within said field of view, so as to determine said particular pixel number location of said bottom edge portion of said calibration card which simulates said true bottom edge portion of an object being scanned by said line scan camera.

3. The combination as set forth in claim 1, for determining the true leading edge portion of an image field of view of an object being scanned by said line scan camera, further comprising:

at least one vertically oriented dark line disposed upon said calibration card at a predetermined horizontal distance from said vertically oriented leading edge portion of said calibration card; and software means, incorporated within said line scan camera and pre-programmed with said horizontal distance that said at least one vertically oriented dark line of said calibration card is spaced from said vertically oriented leading edge portion of said calibration card as a predetermined number of pixels, for determining the particular pixel number location of said at least one vertically oriented dark line, with respect to a detected number of pixels comprising a scanned image field of view, so as to determine the particular pixel number location of said vertically oriented leading edge portion of said calibration card, which simulates the true leading edge portion of an object being scanned by said line scan camera, as a result of correlating said pre-programmed predetermined number of pixels, defining said horizontal distance between said at least one vertically oriented dark line of said calibration card and said leading edge portion of said calibration card, with said particular pixel number location of said at least one vertically oriented dark line as previously determined from said predetermined number of pixels comprising said scanned image field of view, whereby the true leading edge portion of an image field of view of an object being scanned by said line scan camera is determined.

4. The combination as set forth in claim 3, wherein said software means further comprises:

means for subtracting said pre-programmed predetermined number of pixels, defining said horizontal distance between said at least one vertically oriented dark line of said calibration card and said leading edge portion of said calibration card, from said particular pixel number location of said at least one vertically oriented dark line within said scanned field of view, so as to determine said particular pixel number location of said leading edge portion of said calibration card which simulates said true leading edge portion of an object being scanned by said line scan camera.

5. The combination as set forth in claim 3, further comprising:

a scanning window defined within said line scan camera;

conveyor means for conveying said calibration card in a predetermined direction past said scanning window;

pulse means for transmitting pulse signals, indicative of a predetermined number of scanning pixels per inch of travel of said conveyor means, to counting means incorporated within said software of said line scan camera for counting said pulse signals whereby said counted pulsed signals define said detected number of pixels comprising said scanned image field of view; and photodetection means, located upstream of said scanning window as considered in connection with said predetermined conveying direction, for detecting the presence of said leading edge portion of said calibration card as said leading edge portion of said calibration card passes said photodetection means and for emitting a signal to activate said pulse-counting means.

6. A line scan camera adapted for use in conjunction with a calibration card, having a substantially rectangular configuration comprising a horizontally oriented bottom edge portion, a vertically oriented leading edge portion, and at least one horizontally oriented dark line disposed upon the calibration card at a predetermined vertical distance above the bottom edge portion of the calibration card, for determining the true bottom edge portion of an image field of view of an object being scanned by said line scan camera, comprising:

a charge-coupled device (CCD) defining a field of view, comprising a predetermined number of pixels, within said line scan camera and upon which a captured image of an object can be superimposed; and software means, incorporated within said line scan camera and pre-programmed with the vertical distance that the at least one horizontally oriented dark line of the calibration card is spaced from the horizontally oriented bottom edge portion of the calibration card as a predetermined number of pixels, for determining the particular pixel number location of the at least one horizontally oriented dark line, with respect to said predetermined number of pixels comprising said image field of view, so as to determine the particular pixel number location of the bottom edge portion of the calibration card, which simulates the true bottom edge portion of an object being scanned by said line scan camera, by correlating said pre-programmed predetermined number of pixels, defining the vertical distance between the at least one horizontally oriented dark line of the calibration card and the bottom edge portion of the calibration card, with said particular pixel number location of the at least one horizontally oriented dark line as previously determined from said predetermined number of pixels comprising said image field of view, whereby the true bottom edge portion of an image field of view of an object being scanned by said line scan camera is determined.

7. The line scan camera as set forth in claim 6, wherein said software means further comprises:

means for subtracting said pre-programmed predetermined number of pixels, defining said vertical distance between the at least one horizontally oriented dark line of the calibration card and the bottom edge portion of the calibration card, from said particular pixel number location of the at least one horizontally oriented dark line within said field of view, so as to determine said particular pixel number location of the bottom edge portion of the calibration card which simulates said true bottom edge portion of an object being scanned by said line scan camera.

8. The line scan camera as set forth in claim 6, for determining the true leading edge portion of an image field of view of an object being scanned by said line scan camera, further comprising:

software means, incorporated within said line scan camera and pre-programmed with the horizontal distance that at least one vertically oriented dark line of the calibration card is spaced from the vertically oriented leading edge portion of the calibration card as a predetermined number of pixels, for determining the particular pixel number location of the at least one vertically oriented dark line, with respect to a detected number of pixels comprising a scanned image field of view, so as to determine the particular pixel number location of the vertically oriented leading edge portion of the calibration card, which simulates the true leading edge portion of an object being scanned by said line scan camera, by correlating said pre-programmed predetermined number of pixels, defining the horizontal distance between the at least one vertically oriented dark line of the calibration card and the leading edge portion of the calibration card, with said particular pixel number location of the at least one vertically oriented dark line as previously determined from said predetermined number of pixels comprising said scanned image field of view, whereby the true leading edge portion of an image field of view of an object being scanned by said line scan camera is determined.

9. The line scan camera as set forth in claim 8, wherein said software means further comprises:

means for subtracting said pre-programmed predetermined number of pixels, defining the horizontal distance between the at least one vertically oriented dark line of the calibration card and the leading edge portion of the calibration card, from said particular pixel number location of the at least one vertically oriented dark line within said scanned field of view, so as to determine said particular pixel number location of the leading edge portion of the calibration card which simulates the true leading edge portion of an object being scanned by said line scan camera.

10. The line scan camera as set forth in claim 8, further comprising:

a scanning window defined within said line scan camera;

conveyor means for conveying the calibration card in a predetermined direction past said scanning window;

pulse means for transmitting pulse signals, indicative of a predetermined number of scanning pixels per inch of travel of said conveyor means, to counting means incorporated within said software of said line scan camera for counting said pulse signals whereby said counted pulsed signals define said detected number of pixels comprising said scanned image field of view; and photodetection means, located upstream of said scanning window as considered in connection with said predetermined conveying direction, for detecting the presence of the leading edge portion of the calibration card as the leading edge portion of the calibration card passes said photodetection means and for emitting a signal to activate said pulse-counting means.

11. A method of for determining the true bottom edge portion of an image field of view of an object being scanned by a line scan camera within which there is disposed a charge-coupled device (CCD) defining a field of view, comprising a predetermined number of pixels, upon which a captured image of the object being scanned can be superimposed, comprising the steps of:

conveying a calibration card, having a substantially rectangular configuration and comprising a horizontally oriented bottom edge portion, a vertically oriented leading edge portion, and at least one horizontally oriented dark line disposed upon said calibration card at a predetermined vertical distance above said bottom edge portion of said calibration card, in a predetermined direction past a scanning window defined within said line scan camera; and using software means, incorporated within said line scan camera and pre-programmed with said vertical distance that said at least one horizontally oriented dark line of said calibration card is spaced from said horizontally oriented bottom edge portion of said calibration card as a predetermined number of pixels, for determining the particular pixel number location of said at least one horizontally oriented dark line, with respect to said predetermined number of pixels comprising said image field of view, so as to determine the particular pixel number location of said bottom edge portion of said calibration card, which simulates the true bottom edge portion of an object being scanned by said line scan camera, by correlating said pre-programmed predetermined number of pixels, defining said vertical distance between said at least one horizontally oriented dark line of said calibration card and said bottom edge portion of said calibration card, with said particular pixel number location of said at least one horizontally oriented dark line as previously determined from said predetermined number of pixels comprising said image field of view, whereby the true bottom edge portion of an image field of view of an object being scanned by said line scan camera is determined.

12. The method as set forth in claim 11, further comprising the step of:

subtracting said pre-programmed predetermined number of pixels, defining said vertical distance between said at least one horizontally oriented dark line of said calibration card and said bottom edge portion of said calibration card, from said particular pixel number location of said at least one horizontally oriented dark line within said field of view, so as to determine said particular pixel number location of said bottom edge portion of said calibration card which simulates said true bottom edge portion of an object being scanned by said line scan camera.

13. The method as set forth in claim 11, further comprising the step of:

providing at least one vertically oriented dark line upon said first calibration card at a predetermined horizontal distance from said vertically oriented leading edge portion of said calibration card; and using software means, incorporated within said line scan camera and pre-programmed with said horizontal distance that said at least one vertically oriented dark line of said calibration card is spaced from said vertically oriented leading edge portion of said calibration card as a predetermined number of pixels, for determining the particular pixel number location of said at least one vertically oriented dark line, with respect to a detected number of pixels comprising a scanned image field of view, so as to determine the particular pixel number location of said vertically oriented leading edge portion of said calibration card, which simulates the true leading edge portion of an object being scanned by said line scan camera, as a result of correlating said pre-programmed predetermined number of pixels, defining said horizontal distance between said at least one vertically oriented dark line of said calibration card and said leading edge portion of said calibration card, with said particular pixel number location of said at least one vertically oriented dark line as previously determined from said predetermined number of pixels comprising said scanned image field of view, whereby the true leading edge portion of an image field of view of an object being scanned by said line scan camera is determined.

14. The method as set forth in claim 13, further comprising the step of:

subtracting said pre-programmed predetermined number of pixels, defining said horizontal distance between said at least one vertically oriented dark line of said calibration card and said leading edge portion of said calibration card, from said particular pixel number location of said at least one vertically oriented dark line within said scanned field of view, so as to determine said particular pixel number location of said leading edge portion of said calibration card which simulates said true leading edge portion of an object being scanned by said line scan camera.

15. The method as set forth in claim 13, further comprising the steps of:

using pulse means for transmitting pulse signals, indicative of a predetermined number of scanning pixels per inch of travel of said conveyor means, to counting means incorporated within said software of said line scan camera for counting said pulse signals whereby said counted pulse signals define said detected number of pixels comprising said scanned image field of view; and detecting the presence of said leading edge portion of said calibration card, by photodetection means located upstream of said scanning window of said line scan camera, as said leading edge portion of said calibration card passes said photodetection means, and emitting a signal to activate said pulse-counting means.

16. In combination, a calibration card for use in conjunction with a line scan camera for achieving channel-to-channel seam matching of exposure levels of channel boundary pixels disposed within an image field of view of an object being scanned by said line scan camera, comprising:

a line scan camera;

a charge-coupled device (CCD) defining a field of view, comprising a predetermined number of pixels, within said line scan camera and upon which a captured image of an object can be superimposed, and comprising means for dividing said field of view, comprising said predetermined number of pixels, into a predetermined number of channels wherein said predetermined number of channels are separated from each other by channel boundaries;

a blank calibration card, comprising a predetermined color shade, disposed in front of a scanning window of said line scan camera;

means incorporated within said line scan camera for illuminating said blank calibration card with a predetermined video signal input illumination level comprising video signal inputs to each one of said predetermined number of pixels, comprising said field of view upon said charge-coupled device, such that each one of said predetermined number of pixels, comprising said field of view upon said charge-coupled device, exhibits an individual exposure output level; and software means, incorporated within said line scan camera, for applying amplifier gain and black offset parameters to said video signal inputs for said pixels disposed within said predetermined number of channels so as to adjust the exposure output levels of said pixels disposed within said predetermined number of channels in order to substantially match the exposure output levels characteristic of said pixels disposed at said channel boundaries.

17. The combination as set forth in claim 16, wherein:

said means incorporated within said line scan camera for illuminating said blank calibration card with a predetermined video signal input level illuminates said blank calibration card with different predetermined video signal input levels so as to permit said blank calibration card comprising said predetermined color shade to simulate different calibration cards exhibiting different color shades; and said software means, incorporated within said line scan camera for applying said amplifier gain and black offset parameters to said video signal inputs within said predetermined number of channels, applies said amplifier gain and black offset parameters to said video signal inputs within said predetermined number of channels under said different illumination levels so as to adjust the exposure output levels of said pixels disposed within said channels under said different illumination levels in order to substantially match the exposure output levels, characteristic of said pixels disposed at said channel boundaries, under said different illumination levels.

18. The combination as set forth in claim 16, wherein said software means further comprises:

means for detecting the particular pixel within said field of view which exhibits the highest exposure level of all of said pixels within said field of view;

means for applying an amplifier gain parameter only to said video signal input of said single channel of pixels within which said particular pixel, which exhibits said highest exposure level, is located so as to elevate said exposure level of said particular pixel, which exhibits said highest exposure level, to a predetermined target exposure level while said pixels, other than said particular pixel, also disposed within said single channel of pixels, have their respective exposure levels elevated a corresponding amount; and means for applying amplifier gain and black offset parameters to said video signal inputs of said channels of pixels other than said single channel of pixels so as to adjust the exposure output levels of said pixels disposed within said other channels in order to substantially match the exposure output levels characteristic of said pixels disposed at said channel boundaries defined between said single channel and said other channels.

19. The combination as set forth in claim 18, wherein said software further comprises:

means for applying a multiplication correction factor to each one of said exposure output levels of each one of said pixels comprising said image field of view, except for said exposure output level characteristic of said particular pixel already at said predetermined target exposure output level, so as to render said each one of said exposure output levels of said each one of said pixels comprising said image field of view equal to said target exposure output level characteristic of said particular pixel whereby all of said exposure output levels of all of said pixels comprising said image field of view are substantially equal to each other.

20. A line scan camera, adapted for use in conjunction with a blank calibration card comprising a predetermined color shade, for achieving channel-to-channel seam matching of exposure levels of channel boundary pixels disposed within an image field of view of an object being scanned by said line scan camera, comprising:

a scanning window in front of which the blank calibration card is disposed;

a charge-coupled device (CCD) defining a field of view, comprising a predetermined number of pixels, within said line scan camera and upon which a captured image of an object can be superimposed, and comprising means for dividing said field of view, comprising said predetermined number of pixels, into a predetermined number of channels wherein said predetermined number of channels are separated from each other by channel boundaries;

means incorporated within said line scan camera for illuminating the blank calibration card with a predetermined video signal input illumination level comprising video signal inputs to each one of said predetermined number of pixels, comprising said field of view upon said charge-coupled device, such that each one of said predetermined number of pixels, comprising said field of view upon said charge-coupled device, exhibits an individual exposure output level; and software means, incorporated within said line scan camera, for applying amplifier gain and black offset parameters to said video signal inputs for said pixels disposed within said predetermined number of channels so as to adjust the exposure output levels of said pixels disposed within said predetermined number of channels in order to substantially match the exposure output levels characteristic of said pixels disposed at said channel boundaries.

21. The line scan camera as set forth in claim 20, wherein:

said means incorporated within said line scan camera for illuminating the blank calibration card with a predetermined video signal input level illuminates the blank calibration card with different predetermined video signal input levels so as to permit the blank calibration card comprising the predetermined color shade to simulate different calibration cards exhibiting different color shades; and said software means, incorporated within said line scan camera for applying said amplifier gain and black offset parameters to said video signal inputs within said predetermined number of channels, applies said amplifier gain and black offset parameters to said video signal inputs within said predetermined number of channels under said different illumination levels so as to adjust the exposure output levels of said pixels disposed within said channels under said different illumination levels in order to substantially match the exposure output levels, characteristic of said pixels disposed at said channel boundaries, under said different illumination levels.

22. The line scan camera as set forth in claim 20, wherein said software means further comprises:

means for detecting the particular pixel within said field of view which exhibits the highest exposure level of all of said pixels within said field of view;

means for applying an amplifier gain parameter only to said video signal input of said single channel of pixels within which said particular pixel, which exhibits said highest exposure level, is located so as to elevate said exposure level of said particular pixel, which exhibits said highest exposure level, to a predetermined target exposure level while said pixels, other than said particular pixel, also disposed within said single channel of pixels, have their respective exposure levels elevated a corresponding amount; and means for applying amplifier gain and black offset parameters to said video signal inputs of said channels of pixels other than said single channel of pixels so as to adjust the exposure output levels of said pixels disposed within said other channels in order to substantially match the exposure output levels characteristic of said pixels disposed at said channel boundaries defined between said single channel and said other channels.

23. The line scan camera as set forth in claim 22, wherein said software further comprises:

means for applying a multiplication correction factor to each one of said exposure output levels of each one of said pixels comprising said image field of view, except for said exposure output level characteristic of said particular pixel already at said predetermined target exposure output level, so as to render said each one of said exposure output levels of said each one of said pixels comprising said image field of view equal to said target exposure output level characteristic of said particular pixel whereby all of said exposure output levels of all of said pixels comprising said image field of view are substantially equal to each other.

24. A method for achieving channel-to-channel seam matching of exposure levels of channel boundary pixels disposed within an image field of view of an object being scanned by a line scan camera, within which there is disposed a charge-coupled device (CCD) for defining said image field of view comprising a predetermined number of pixels, upon which a captured image of an object can be superimposed, and comprising means for dividing said field of view, comprising said predetermined number of pixels, into a predetermined number of channels wherein said predetermined number of channels are separated from each other by channel boundaries, comprising the steps of:

disposing a blank calibration card, comprising a predetermined color shade, in front of a scanning window of said line scan camera;

illuminating said blank calibration card with a predetermined video signal input illumination level comprising video signal inputs to each one of said predetermined number of pixels, comprising said field of view upon said charge-coupled device, such that each one of said predetermined number of pixels, comprising said field of view upon said charge-coupled device, exhibits an individual exposure output level; and using software means, incorporated within said line scan camera, for applying amplifier gain and black offset parameters to said video signal inputs for said pixels disposed within said predetermined number of channels so as to adjust the exposure output levels of said pixels disposed within said predetermined number of channels in order to substantially match the exposure output levels characteristic of said pixels disposed at said channel boundaries.

25. The method as set forth in claim 24, further comprising the steps of:

illuminating said blank calibration card with different predetermined video signal input levels so as to permit said blank calibration card comprising said predetermined color shade to simulate different calibration cards exhibiting different color shades; and applying said amplifier gain and black offset parameters to said video signal inputs within said predetermined number of channels under said different illumination levels so as to adjust the exposure output levels of said pixels disposed within said channels under said different illumination levels in order to substantially match the exposure output levels, characteristic of said pixels disposed at said channel boundaries, under said different illumination levels.

26. The method as set forth in claim 24, further comprising the steps of:

using said software means to detect the particular pixel within said field of view which exhibits the highest exposure level of all of said pixels within said field of view;

applying an amplifier gain parameter only to said video signal input of said single channel of pixels within which said particular pixel, which exhibits said highest exposure level, is located so as to elevate said exposure level of said particular pixel, which exhibits said highest exposure level, to a predetermined target exposure level while said pixels, other than said particular pixel, also disposed within said single channel of pixels, have their respective exposure levels elevated a corresponding amount; and applying amplifier gain and black offset parameters to said video signal inputs of said channels of pixels other than said single channel of pixels so as to adjust the exposure output levels of said pixels disposed within said other channels in order to substantially match the exposure output levels characteristic of said pixels disposed at said channel boundaries defined between said single channel and said other channels.

27. The method as set forth in claim 26, further comprising the step of:

applying a multiplication correction factor to each one of said exposure output levels of each one of said pixels comprising said image field of view, except for said exposure output level characteristic of said particular pixel already at said predetermined target exposure output level, so as to render said each one of said exposure output levels of said each one of said pixels comprising said image field of view equal to said target exposure output level characteristic of said particular pixel whereby all of said exposure output levels of all of said pixels comprising said image field of view are substantially equal to each other.

28. A calibration card for use in conjunction with a line scan camera, having a charge-coupled device (CCD) incorporated therein for defining a field of view comprising a predetermined number of pixels and upon which a captured image of an object can be superimposed, for determining the true bottom edge portion of an image field of view of an object being scanned by the line scan camera, comprising:

a substantially rectangularly configured calibration card having a horizontally oriented bottom edge portion and a vertically oriented leading edge portion; and first indicia disposed upon said calibration card at a predetermined vertical distance above said bottom edge portion of said calibration card such that software, incorporated within the line scan camera and pre-programmed with said vertical distance that said first indicia of said calibration card is spaced from said horizontally oriented bottom edge portion of said calibration card as a predetermined number of pixels, can determine the particular pixel number location of said first indicia, with respect to the predetermined number of pixels comprising the image field of view, so as to determine the particular pixel number location of said bottom edge portion of said calibration card, which simulates the true bottom edge portion of an object being scanned by the line scan camera, by correlating the pre-programmed predetermined number of pixels, defining said vertical distance between said first indicia of said calibration card and said bottom edge portion of said calibration card, with the particular pixel number location of said first indicia as previously determined from the predetermined number of pixels comprising the image field of view, whereby the true bottom edge portion of an image field of view of an object being scanned by the line scan camera is determined.

29. The calibration card as set forth in claim 28, for determining the true leading edge portion of an image field of view of an object being scanned by the line scan camera, further comprising:

second indicia disposed upon said calibration card at a predetermined horizontal distance from said vertically oriented leading edge portion of said calibration card such that software, incorporated within the line scan camera and pre-programmed with said horizontal distance that said second indicia of said calibration card is spaced from said vertically oriented leading edge portion of said calibration card as a predetermined number of pixels, can determine the particular pixel number location of said second indicia, with respect to a detected number of pixels comprising a scanned image field of view, so as to determine the particular pixel number location of said vertically oriented leading edge portion of said calibration card, which simulates the true leading edge portion of an object being scanned by the line scan camera, as a result of correlating the pre-programmed predetermined number of pixels, defining said horizontal distance between said second indicia of said calibration card and said leading edge portion of said calibration card, with the particular pixel number location of said second indicia as previously determined from the predetermined number of pixels comprising the scanned image field of view, whereby the true leading edge portion of an image field of view of an object being scanned by said line scan camera is determined.

* * * * *